United States Patent Office 3,761,358
Patented Sept. 25, 1973

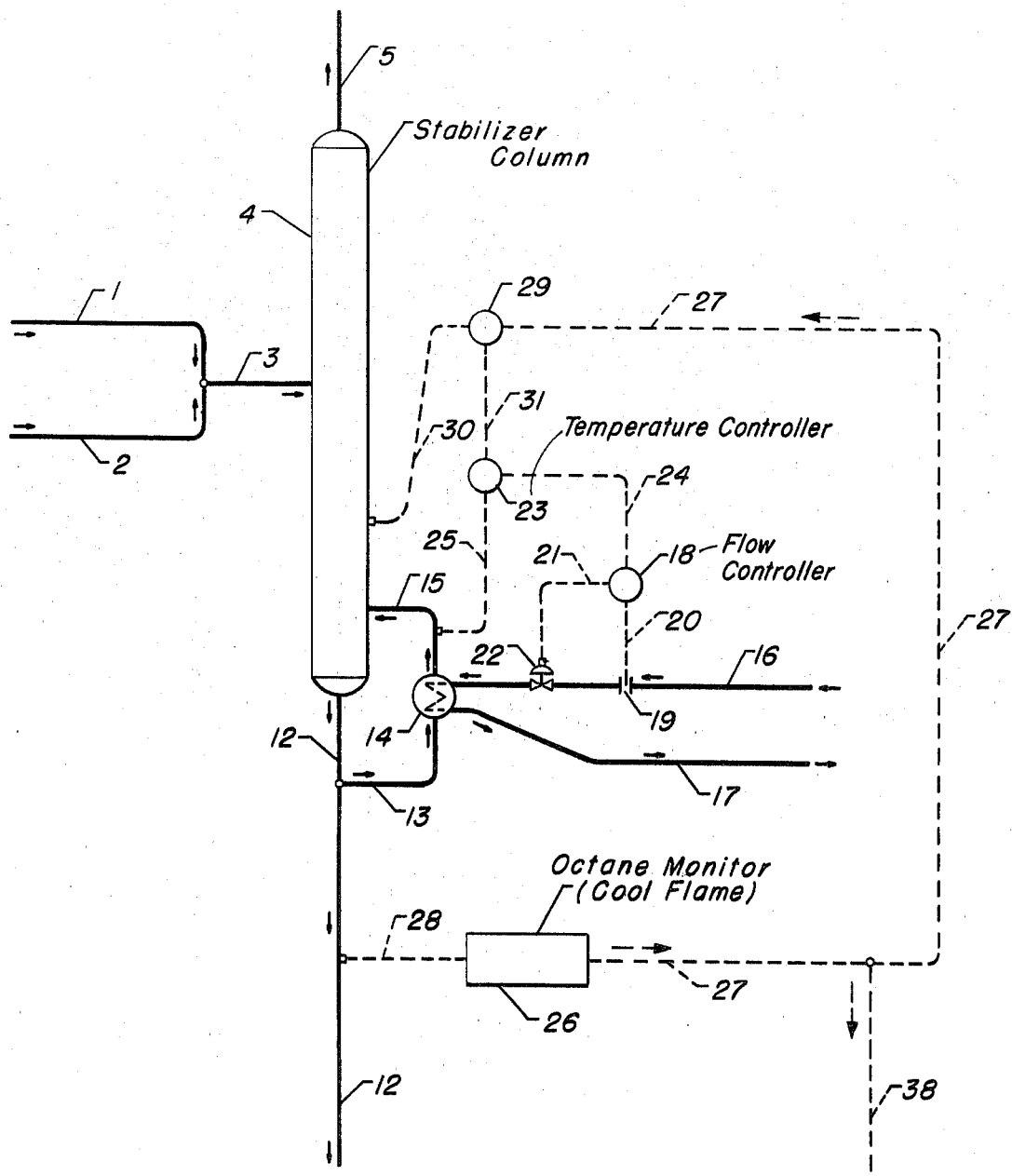

3,761,358
COMBINATION COLUMN REBOILER HEAT INPUT
AND OCTANE CONTROL PROCESS
Walter A. Bajek, Lombard, and James H. McLaughlin, La Grange, Ill., assignors to Universal Oil Products Company, Des Plaines, Ill.
Continuation-in-part of application Ser. No. 868,458, Oct. 22, 1969. This application Feb. 14, 1972, Ser. No. 226,034
The portion of the term of the patent subsequent to Mar. 7, 1989, has been disclaimed
Int. Cl. B01d 3/42
U.S. Cl. 196—132                                33 Claims

ABSTRACT OF THE DISCLOSURE

A process for the control of the heat input to a reboiler for a stabilizer column. The process includes a combination of an on-stream octane monitor and an octane blending means to allow the production of a blended gasoline product having an essentially constant barrel-octane number. The process is applicable to all refinery flow streams in which gasoline is desired to be stabilized. In particular, the combined process control utilizes a stabilized cool flame generator with servo-positioned flame front which receives a sample of the column bottoms and monitors its octane. A flow measurement means measures the flow of bottoms material. Both the flow measurement means and octane monitor generates signals which pass to a volumetric-octane measurement means which controls the octane blending means controlling the blending of an octane modifying stream which can comprise gasoline, tetraethyl lead aromatics with the bottoms gasoline in a manner to produce a blended gasoline product.

RELATED APPLICATIONS

This application is a continuation-in-part of our copending application Ser. No. 868,458, filed Oct. 22, 1969, now Pat. 3,647,634. All the teachings of said copending application are incorporated into this application by specific reference thereto.

BACKGROUND OF THE INVENTION

Field of the invention

The field of art to which this application relates is hydrocarbon separation control processes. In particular, this invention relates to a combination process for the control of a stabilizer column bottoms stream to produce a bottoms stream which has a predetermined barrel-octane value.

Description of the prior art

The prior art contains a large quantity of patents and published articles relating to the control of stabilizer columns. In particular there is much art relating to the control of the bottoms octane number from a stabilizer column by utilizing a flow control loop which controls the heat input to the reboiler. Our invention utilizes a combination of an on-stream octane monitor in combination with a bottoms flow measuring device to control the heat input to the stabilizer column therein maintaining a preset octane number of the bottoms output stream and controlling the method of blending of the bottoms stream and an octane modifying stream to produce a bottoms product material having a constant volumetric-octane (barrel-octane) value.

This invention can be specifically utilized in gasoline production where it is desired to produce a single grade of gasoline or a constant barrel-octane value gasoline.

SUMMARY OF THE INVENTION

This invention can be summarized as a combination process for the control of a stabilizer column. Specifically, this invention can be summarized as a combination process for controlling a stabilizer column by utilizing an octane monitor which monitors the bottoms octane number and a flow recording device which measures the flow rate of bottoms material produced to generate output signals which can be passed to a blending means for the blending of the bottoms flow with a modifying stream to produce a given barrel octane number product.

A broad embodiment of this invention resides in a process control scheme in combination with a continuous flow fractional distillation column, the feed to which is a gasoline fraction, the overhead from which comprises the lower boiling components of said fraction and the bottoms from which comprises the higher boiling components of said fraction, said column including a reboiler section having a vapor outlet connecting with the lower portion of the column and means to supply heat to said reboiler from an extraneous heat source, a control system for said column comprising:

(1) means operatively associated with said heat supply means to vary the heat input to said reboiler;

(2) a hydrocarbon analyzer comprising a stabilized cool flame generator with a servo-positioned flame front receiving a sample of said column bottoms and developing a bottoms octane number signal which provides a measure of sample octane number of said bottoms stream;

(3) means transmitting said bottoms octane signal to said heat input varying means whereby the heat input to said column is regulated responsive to said octane signal of said column bottoms and said octane number is thereby maintained at a substantially constant predetermined level;

(4) flow measurement means operatively associates the bottoms stream to measure the flow rate of the bottoms stream and produce a bottoms flow rate output signal;

(5) means transmitting said bottoms flow rate output signal and said bottoms octane output signal to a volume-octane measurement means which means produces a volumetric-octane output signal varying in production to the flow measurement means output signal and the octane analyzer octane output signal; and (6) means transmitting said volumetric-octane output signal to an octane blending means which effects the blending of said bottoms stream with octane and modifying streams to produce a blended gasoline stream leaving a preset volumetric-octane value.

DESCRIPTION OF THE DRAWING

The invention will be more clearly understood by reference to the accompanying drawings in which:

FIG. 2 is a fragmentary view of a stabilizer column with a triple cascade system for regulating heat input.

Figure 1:
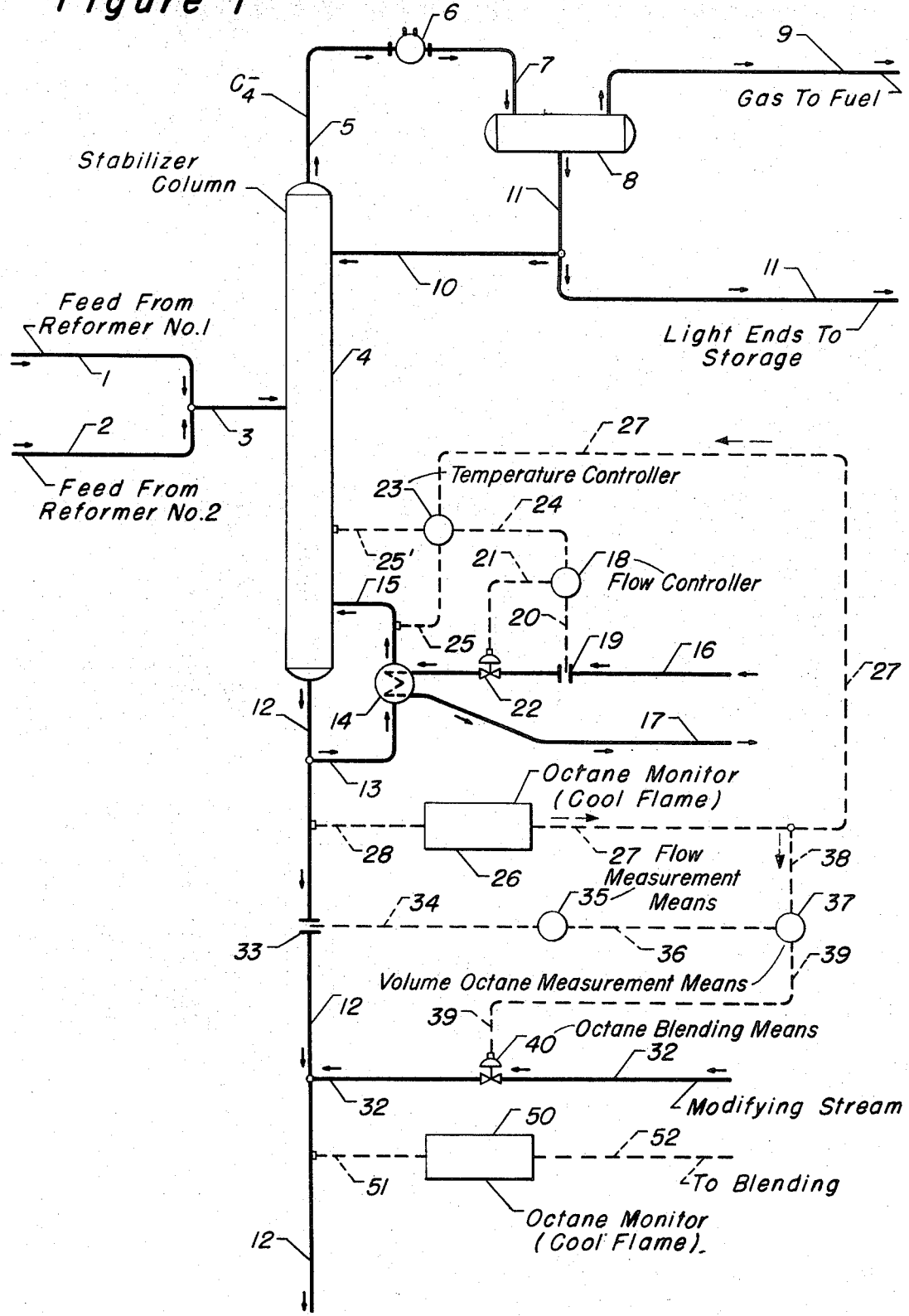
FIG. 1 illustrates a stabilizer column together with one mode of controlling the heat input thereto.

With reference now to FIG. 1, there is shown a stabilizer column 4 receiving a plurality of unstabilized gasoline feeds. Stabilizer column 4 is a conventional continuous flow externally refluxed fractional distillation column containing from 10 to 50 or more vertically spaced vapor-liquid contacting stages as, for example, bubble decks, sieve decks, perforated trays or the like. Line 1 carries unstabilized reformate from naphtha reforming unit No. 1. Line 2 carries unstabilized reformate from naphtha reforming unit No. 2. The combined reformates are charged to the column via line 3 which connects with the column at a locus approximately midway in the height thereof.

The two reforming units are separate, independently operated catalytic naphtha reforming units; the details thereof form no part of the present invention, being conventional and well known in the art. A typical catalytic naphtha hydro-reforming unit is described in U.S. Pat. 3,296,118 (Class 208–100) to which reference may be had for specific information concerning flow arrangement, catalyst, conditions, etc. The feed to column 4 is generally under reactor products separator level control rather than direct flow control. Accordingly, the feed rate is usually but not always relatively constant, and may be subject to some variation due to changes in catalyst and/or operating conditions in either or both of the catalytic reforming units.

The overhead material from column 4, typically comprising predominantly $C_4$ and lighter hydrocarbons, together with some hydrogen, is removed via line 5, condensed in overhead condenser 6, and passed via line 7 to overhead receiver 8. Non-condensibles are removed through line 9. Overhead condensate, comprising essentially butanes with some propane, is taken off from receiver 8, a portion thereof being returned through line 10 as reflux to column 4 and the remainder being sent via line 11 to storage. Conventional instrumentation control, not here illustrated, will be provided to control column pressure, overhead receiver liquid level, reflux rate and column top temperature.

Stabilized gasoline product typically comprising $C_5$ to 400° F. endpoint material is taken off through bottoms drawoff line 12 and sent to storage or to further processing. As used herein, the term "endpoint" and the temperatures illustrated are those typically defined by laboratory distillation in accordance with ASTM Method D–86. A portion of stabilizer bottoms is recirculated via line 13 through reboiler 14 and then through vapor transfer line 15 back to the lower portion of column 4. Reboiler 14 may be a shell and tube heat exchanger, as illustrated, or a stab-in internal reboiler or a fired heater. Bottoms circulation may be forced convection or thermosyphon. A suitable fluid heating medium, for example steam, is passed through the tube side of reboiler 14 via lines 16 and 17. The steam flow rate is regulated by a flow control loop comprising orifice 19, flow signal line 20, flow controller 18, controller output line 21 and valve 22. The setpoint of flow controller 18 is automatically adjustable.

The temperature control means, also with automatically adjustable setpoint, senses and controls reboiler vapor temperature as detected by a sensing means such as thermocouple 25 located in vapor outlet line 15. The resulting temperature output signal is transmitted via line 24 to adjust or reset the setpoint of flow controller 18.

Octane monitor 26, utilizing a stabilized cool flame generator with servo-positioned flame front, is field-installed adjacent to column 4. In a preferred embodiment, the flows of oxidizer (air) and fuel (gasoline sample) are fixed as is the induction zone temperature. Combustion pressure is the parameter which is varied in a manner to immobilize the stabilized cool flame front. Upon a change in sample octane number, the change in pressure required to immobilize the flame front provides a direct indication of the change in octane number. Typical operating conditions for the octane monitor are:

Air flow—3500 cc./min. (STP)
Fuel flow—1 cc./min.
Induction zone, temperature—700° F. (Research octane)
   800° F. (Motor Octane)
Combustion pressure—4–20 p.s.i.g.
Octane range (max.)—80–102*

*The actual calibrated span of the octane monitor as here utilized will, in general, be considerably narrower. For example, if the target octane is 95 clear (research method), a suitable span may be 92–98 research octane. When a relatively narrow span is employed, the octane number change is essentially directly proportional to the change in combustion pressure.

Dashed line 28 represents a suitable sampling system to provide a sample of column bottoms to the octane monitor. For example, the sampling system may comprise a sample loop taking bottoms at a rate of 100 cc. per minute from a point upstream of a control valve and returning it to a point downstream from the control valve, the sample itself being drawn off from an intermediate portion of the sample loop and injected at a controlled rate by a metering pump to the combustion tube of the octane monitor.

The octane monitor output signal is transmitted via line 27 to the setpoint of temperature controller 23 and via line 38 to volume-octane measurement means 37. This may be a direct field connection, but preferably the octane monitor output will first be sent to an octane controller-recorder located in the refinery control house, and the control signal therefrom then being set to reset the setpoint of temperature controller 23 and volume-octane measurement means 37.

Upon a decrease in the measured octane number of the bottoms product, the octane monitor will call for an increase in reboiler vapor temperature to drive out a greater proportion of the light ends from the column bottoms. Temperature control means 23 will then call for an increase in steam flow which in turn will be effected by flow controller 18. If the octane number deviation is in the opposite direction, e.g., becomes higher than octane specification, the octane monitor will call for a decrease in reboiler vapor temperature, and the overall corrective action will be the reverse of that previously described. In either event, the octane number of the stabilized gasoline is continuously maintained at a substantially constant predetermined level.

The same passing to temperature control means 23 also passes to the volume-octane measurement means 37. This means also receives a bottoms flow rate output signal from flow measurement means 35 which transfers a signal from the flow measurement device 33.

The volume-octane measurement means receives the output signals from the bottoms flow measurement means and the bottoms octane analyzer signal and converts these combined signals to a volumetric-octane output signal. This signal in turn is utilized to control the octane blending means 40 to eventually produce a blended gasoline product of a given volumetric-octane (barrel octane) value. The octane blending means shown as a valve 40 directly connected to the volumetric-octane measuring means 37. In other embodiments the octane blending means comprises a flow control loop including a flow controller which controls the blending of said bottoms and said modifying stream 32. The flow controller can have an adjustable setpoint regulating the rate of flow of either the bottoms stream 12 or the blending stream 32 in response to the output signal from the volumetric-octane signal.

Octane monitor 50 may be used to measure the value of the blended stream passing through line 12. The monitor measures octane by sampling through line 51. The octane of the output stream can be sent via line 52, to a blending scheme which can cause the blended stream to pass into different product tanks or it can be used to check the blending means connected to volume-octane means 37 by offering feedback data to that system. In some instances octane monitor 50 can be used to reset the blending means should drift occur.

A ratio station may also be used in connection with the blending means so that a given volume of known octane bottoms material can be blended with a predetermined quantity of a known octane modifying stream. In this manner the ratio of the volumes of the bottoms material produced and the octane modifying stream used is the method of controlling the final blended product material passing through line 12.

FIG. 1 further illustrates an alternate embodiment wherein the temperature control means 23 senses and controls not the reboiler vapor as it emerges directly from reboiler 14, but rather the liquid or vapor temperature obtaining within the column at a point some distance above the reboiler vapor line and below the feed inlet. In this instance, a thermocouple 25' is used in lieu of thermocouple 25, the former being located several trays (for example 2–6 trays) above vapor outlet 15. This latter arrangement will afford a more immediate detection of increasing light ends concentration, resulting for example from an over-reflux condition, at least several minutes before such light ends reach the reboiler to cause a change in the operation thereof.

While the double cascade arrangement illustrated in FIG. 1 represents a preferred embodiment, it is within the scope of this invention to omit the temperature control means 23 and to reset flow controller 18 directly by the octane monitor output signal transmitted via line 27. In this instance the flow control loop including controller 18, means 19 and valve 22 comprise a flow control means as that term is used in the claims. Alternatively, the flow controller 18 could also be omitted, in which case octane monitor output signal line 27 would connect directly with valve 22. It may be expected, however, that elimination of either or both of the subloops will result in somewhat poor overall control because reboiler temperature and steam flow variations will become a source of additional upsets and also because the relatively large time constant of the stabilizer column itself tends to make single loop control unstable.

FIG. 2 illustrates still another embodiment of the invention which differs in the provision of a second temperature controller. Here a thermocouple 30, located several trays above vapor outlet line 15, provides a temperature input signal to the temperature control means 29 which has an adjustable setpoint. The temperature output signal from temperature control means 29 is transmitted via line 31 to reset the setpoint of temperature control means 23. Control means 23 obtains its input signal from thermocouple 25 located in transfer line 15. The octane monitor output signal is transmitted via line 27 to reset the adjustable setpoint of temperature control means 29. The construction and operation of the remaining components of the control system are the same as previously described in connection with FIG. 1. The triple cascade system of FIG. 2 will be particularly advantageous when it is anticipated that the feed rate and/or feed composition to the stabilizer column will be subject to substantial variation.

Those skilled in the art will furthermore perceive that the inventive control system is not limited to the specific embodiments disclosed. For example, the stabilizer column 4 could be operated as a deethanizer, a depropanizer, a depentanizer, or a dehexanizer and still derive the operational benefits of the inventive control system. Furthermore, column 4 could be operated as a gasoline splitter column, wherein a gasoline feed fraction would be separated into low boiling and high boiling constituents for subsequent gasoline blending purposes as, for example, wherein a debutanized gasoline is split into an overhead fraction having an endpoint of 380° F. and a bottoms fraction comprising hydrocarbons boiling above 380° F.

DETAILED DESCRIPTION OF THE INVENTION

The invention of this application is a process control application of the hydrocarbon analyzer described in U.S. Pat. 3,463,613 having E. R. Fenske and J. H. McLaughlin, as its inventors. The teachings of said patent, both general and specific, are incorporated by reference herein.

As set forth in U.S. Patent 3,463,613, the composition of a hydrocarbon sample can be determined by burning the sample in a combustion tube under conditions to generate therein a stabilized cool flame. The position of the flame front is automatically detected and used to develop a control signal which, in turn, is used to vary a combustion parameter, such as combustion pressure, induction zone temperature or air flow, in a manner to immobilize the flame front regardless of changes in composition of the sample. The change in such combustion parameter required to immobilize the flame following a change of sample composition is correlatable with such composition change. An appropriate read-out device connecting therewith may be calibrated in terms of the desired identifying characteristic of the hydrocarbon sample, as, for example, octane number. Such an instrument is conveniently identified as a hydrocarbon analyzer comprising a stabilized cool flame generator with a servo-positioned flame front. The type of analysis effected thereby is not a compound-by-compound analysis of the type presented by instruments such as mass spectrometers or vapor phase chromatographs. On the contrary, the analysis is represented by a continuous output signal which is responsive to and indicative of hydrocarbon composition and, more specifically, is empirically correlatable with one or more conventional identifications or specifications of petroleum products such as Reid vapor pressure, ASTM or Engler distillations or, for motor fuels, knock characteristics such as research octane number, motor octane number or composite of such octane numbers.

For the purpose of the present application, the hydrocarbon analyzer is further limited to that specific embodiment which is designed to receive a hydrocarbon sample mixture containing predominantly gasoline boiling range components, and the output signal of which analyzer provides a direct measure of octane number, i.e. research octane, motor octane or a predetermined composite of the two octane ratings. For brevity, the hydrocarbon analyzer will be referred to in the following description and accompanying drawings simply as an "octane monitor."

An octane monitor based on a stabilized cool flame generator possesses numerous advantages over conventional octane number instruments such as the CFR engine or automated knock-engine monitoring systems. Among these are: elimination of moving parts with corresponding minimal maintenance and down-time; high accuracy and reproducibility; rapid speed of response providing a continuous, real-time output; compatibility of output signal with computer or controller inputs; ability to receive and rate gasoline samples of high vapor pressure, e.g. up to as high as 500 p.s.i.g., as well as lower vapor pressure samples (5–250 p.s.i.g.). These characteristics make the octane monitor eminently suitable not only for an indicating or recording function, but particularly for a process control function wherein the octane monitor is the primary sensing element of a closed loop control system comprising 0, 1, 2 or more subloops connected in cascade.

The present invention has as its principal objective the direct control of octane number of a stabilizer or splitter column bottoms stream. A stabilizer is an externally refluxed, multiple tray, fractional distillation column employed to remove the light ends from unstabilized or wild gasoline. For example, the feed to such a column is, typically, unstabilized reformate from a catalytic naphtha hydroreforming unit. The hot vaporous reactor effluent containing hydrogen, normally gaseous hydrocarbons and gasoline boiling range hydrocarbons is condensed and passed to a separation zone which is a single stage gravity-type phase separator maintained at reforming pressure range of, say, 50–500 p.s.i.g. The liquid hydrocarbon or unstabilized reformate phase is in equilibrium therein with the gas phase containing a major proportion of hydrogen. The hydrogen is withdrawn and a portion thereof is recycled to the inlet of the catalytic reforming zone together with the naphtha charge. The liquid hydrocarbon phase from the separator is the feed to the stabilizer column. It contains a minor proportion of dissolved hydrogen and $C_1$–$C_4$ hydrocarbons which must be removed in order that the stabilized reformate will meet vapor pressure and octane number specifications. A typical sample of catalytic reformate from a separator operating at 250 p.s.i.g. consists of:

| Component: | Mol percent |
| --- | --- |
| $H_2$ | 2.5 |
| $C_1$ | 0.5 |
| $C_2$ | 1.5 |
| $C_3$ | 2.5 |
| $i-C_4$ | 2.5–3.5 |
| $n-C_4$ | 2.5–3.5 |
| $i-C_5$ | 3.5–5 |
| $n-C_5$ | 3.5–5 |
| $C_5$–400° F. endpoint | 81.0–76.0. |

The overhead from the column is predominantly $C_4$ and lighter hydrocarbons and the column bottoms is stabilized gasoline comprising predominantly $C_5$ to about 400° F. endpoint material. By and large it has been the practice to operate such a column mostly "in the dark" so far as product octane number is concerned. That is to say, the column bottoms is manually sampled perhaps once every eight hour shift or perhaps even only once a day. The sample is picked up and taken to the laboratory where the sample is run and the result then transmitted back to the unit operator who, until then, has not been able to ascertain what change, if any, should have been made at the time the sample was taken. Therefore, to be on the safe side, the unit operator will usually run the column with excessive heat input and with corresponding over-reflux whereby the stabilized reformate will actually be outside of product specifications with respect to octane number a good part of the time. This mode of operation clearly increases the refiner's costs.

The control problem is further complicated by the not uncommon practice of using a single stabilizer to process more than one gasoline stream. For example, a single stabilizer column will often receive plural or combined feeds which are unstabilized reformates from two or more independently operated catalytic naphtha reforming units. An upset in the operation of a single such reformer will carry through to the stabilizer and be reflected in off-specification product so that the stabilizer bottoms product is no longer indicative of only the operation of a single reformer. Continuously meeting octane number specification is an exceedingly difficult and haphazard task when employing a single stabilizer column to handle a plurality of gasoline streams.

In accordance with the present invention, the octane monitor comprising a stabilized cool flame generator with servo-positioned flame front is connected to receive a continuous sample of the column bottoms. The output signal of the octane monitor, which can be, and preferably is, calibrated directly in terms of octane number, is utilized to reset or adjust reboiler heat input to the column so that the bottoms octane number is maintained at a substantially constant predetermined level. The octane monitor output signal also is passed to the volumetric-octane measurement means.

Because there is a direct measurement and control of octane rating and real time blending in response to the volumetric-octane of the bottoms this control system is to be distinguished from those prior art control systems wherein some composition property, such as percent aromatics or conductivity or dielectric constant, is measured and controlled, all of these latter properties being merely an indirect indication of octane rating which is only narrowly correlatable therewith. Such indirect correlation becomes invalid for any significant deviation from the design control point.

The control system of this invention is also to be distinguished from those prior art systems employing automated knock-engines as the octane measuring device. The instant octane monitor is compact in size, can be totally enclosed by an explosion-proof housing and therefore can be used in hazardous locations. In fact it is normally field-installed immediately adjacent the stabilizer column. A knock-engine, however, cannot be employed in hazardous locations and must therefore be situated remote from the sample point. The sample transport lag or dead time of a close-coupled octane monitor is typically of the order of two minutes, and its 90% response time is another two minutes. This is a very good approach to an essentially instantaneous or real time output.

By way of contrast, the transport lag alone of a knock-engine may be of the order of thirty minutes or more, which those skilled in the control system art will recognize to be a substantial departure from real time output. With that much dead time built into a closed loop, it is extremely difficult to achieve and maintain stability. The injection of an outside disturbance of any appreciable magnitude, in such a potentially unstable system, will often result in undampened cycling with the consequence that the system will have to be put on manual control.

The octane modifying streams as utilized in this specification refer to streams which can be combined with the bottoms gasoline stream from the stabilizer column to produce a given barrel-octane gasoline product stream. Specifically, it is preferred to add the octane modifying stream to the bottoms from the stabilizer column by utilizing the blending means which controls the flow rate of the octane modifying stream. In other instances the octane modifying stream may be combined with varying quantities of the gasoline bottoms stream to produce a gasoline product having a given barrel octane number.

Specific examples of octane modifying streams include tetraethyl lead, butane, aromatics such as benzene, toluene or xylenes or another gasoline stream. The blending streams may have octane numbers above or below the octane numbers of the bottoms gasoline stream from the stabilizer column depending upon the feed to the stabilizing column and the particular octane modifying stream utilized.

In a specific embodiment the octane modifying stream is tetraethyl lead and is added to the bottoms gasoline stream from the stabilizer column as controlled by the octane blending means. In this instance the octane blending means may be a flow control loop which controls the quantity of tetraethyl lead which is blended with the bottoms gasoline in response to the volumetric-octane output signal.

In still further embodiment the octane blending means may be a control loop in which the stabilizer column bottoms stream and a modifying stream are passed simultaneously into a blending tank with the blending means varying either of the streams according to the desired barrel octane number desired of the material contained in the tank.

The flow measuring devices which can be utilized in this invention can be orifice meters, turbine meters or any other known methods for generating output signal in response to flow rates. Preferred are the turbine flow meters and the orifice flow meters which can measure flow rates to an accuracy within 2% of the actual flow.

We claim:

1. In combination with a continuous flow fractional distillation column, the feed to which is a gasoline fraction, the overhead from which comprises the lower boiling components of said fraction and the bottoms from which comprises the higher boiling components of said fraction, said column including a reboiler section having a vapor outlet connecting with the lower portion of the column and means to supply heat to said reboiler from an extraneous heat source, a control system for said column comprising:
   (1) means operatively associated with said heat supply means to vary the heat input to said reboiler;
   (2) a hydrocarbon analyzer comprising a stabilized cool flame generator with a servo-positioned flame front receiving a sample of said column bottoms and developing a bottoms octane number signal which provides a measure of sample octane number of said bottoms stream;

(3) means transmitting said bottoms octane signal to said heat input varying means whereby the heat input to said column is regulated responsive to said signal of said column bottoms and said octane number is thereby maintained at a substantially constant predetermined level;

(4) flow measurement means operatively associated with the bottoms stream to measure the flow rate of the bottoms stream and produce a bottoms flow rate output signal;

(5) means transmitting said bottoms flow rate output signal and said bottoms octane output signal to a volume-octane measurement means which means produces a volumetric-octane output signal varying in proportion to the flow measurement means output signal and the octane analyzer octane output signal; and (6) means transmitting said volumetric-octane output signal to an octane blending means which effects the blending of said bottoms stream and octane modifying streams to produce a blended gasoline stream having a preset volumetric-octane value.

2. The system of claim 1 wherein the feed to said column comprises unstabilized gasoline, the overhead comprises $C_4$ and lighter hydrocarbons, and the bottoms comprises stabilized gasoline containing $C_5$ and heavier hydrocarbons.

3. The system of claim 1 wherein said heat input varying means comprises a flow control loop including a flow controller having an adjustable setpoint regulating the rate of flow of heating medium through said reboiler, said setpoint being adjusted in response to said bottoms octane output signal.

4. The system of claim 3 further characterized in the provision of means to sense the temperature in said column at a locus below the feed inlet thereto, temperature control means having an adjustable setpoint connecting with said temperature sensing means and developing a temperature output signal, and means transmitting the last-mentioned output signal to the setpoint of said flow controller, said means transmitting said octane output signal to the temperature control means setpoint whereby the latter is adjusted responsive to bottoms octane number.

5. The system of claim 4 wherein said temperature sensing means is located in the vapor outlet from said reboiler.

6. The system of claim 4 wherein said temperature sensing means is located several trays above said vapor outlet.

7. The system of claim 3 further characterized in the provision of a first means to sense the temperature in said column at a locus below the feed inlet thereto and several trays above said reboiler vapor outlet, a second means to sense the temperature in said reboiler vapor outlet, a first temperature control means with adjustable setpoint connecting with said first sensing means and developing a first temperature output signal, a second temperature control means with adjustable setpoint connecting with said second sensing means and developing a second temperature output signal, means transmitting said first output signal to the setpoint of said second temperature control means, means transmitting said second output signal to the setpoint of said flow controller, said means transmitting said octane output signal to the first temperature control means setpoint whereby the latter is adjusted responsive to bottoms octane number.

8. The system of claim 1 wherein said octane modifying stream comprises tetraethyl lead.

9. The system of claim 1 wherein said octane modifying stream comprises butane.

10. The system of claim 1 wherein said octane modifying stream comprises an aromatic selected from the group consisting of benzene, toluene and xylene.

11. The system of claim 1 wherein said octane modifying stream comprises a gasoline having an octane number higher than the octane number of said bottoms stream.

12. In combination with a continuous flow fractional distillation column, the feed to which is a gasoline fraction, the overhead from which comprises the lower boiling components of said fraction and the bottoms from which comprises the higher boiling components of said fraction, said column including a reboiler section having a vapor outlet connecting with the lower portion of the column and means to supply heat to said reboiler from an extraneous heat source, a control system for said column comprising:

(1) means operatively associated with said heat supply means to vary the heat input to said reboiler;

(2) a hydrocarbon analyzer comprising a stabilized cool flame generator with a servo-positioned flame front receiving a sample of said column bottoms and developing a bottoms octane number signal which provides a measure of sample octane number of said bottoms stream;

(3) means transmitting said bottoms octane signal to said heat input varying means whereby the heat input to said column is regulated responsive to said octane signal of said column bottoms and said octane number is thereby maintained at a substantially constant predetermined level;

(4) flow measurement means operatively associated with the bottoms stream to measure the flow rate of the bottoms stream and produce a bottoms flow rate output signal;

(5) means transmitting said bottoms flow rate output signal and said bottoms octane output signal to a volume-octane measurement means which means produces a volumetric-octane output signal varying in proportion to the flow measurement means output signal and the octane analyzer octane output signal; and (6) means transmitting said volumetric-octane output signal to an octane blending means which comprises a flow control loop including a flow controller which controls the blending of an octane modifying stream with said bottoms stream and has an adjustable setpoint regulating the rate of flow of said octane modifying stream, said setpoint being adjusted in response to said volumetric-octane signal.

13. The system of claim 12 wherein the feed to said column comprises unstabilized gasoline, the overhead comprises $C_4$ and lighter hydrocarbons, and the bottoms comprises stabilized gasoline containing $C_5$ and heavier hydrocarbons.

14. The system of claim 12 wherein said heat input varying means comprises a flow control loop including a flow controller having an adjustable setpoint regulating the rate of flow of heating medium through said reboiler, said setpoint being adjusted in response to said bottoms octane output signal.

15. The system of claim 14 further characterized in the provision of means to sense the temperature in said column at a locus below the feed inlet thereto, temperature control means having an adjustable setpoint connecting with said temperature sensing means and developing a temperature output signal, and means transmitting the last-menitoned output signal to the setpoint of said flow control means, said means transmitting said octane output signal to the temperature controller setpoint whereby the latter is adjusted responsive to bottoms octane number.

16. The system of claim 15 wherein said temperature sensing means is located in the vapor outlet from said reboiler.

17. The system of claim 15 wherein said temperature sensing means is located several trays above said vapor outlet.

18. The system of claim 14 further characterized in the provision of a first means to sense the temperature in said column at a locus below the feed inlet thereto and several trays above said reboiler vapor outlet, a second means to sense the temperature in said reboiler vapor outlet, a first temperature control means with adjustable setpoint connecting with said first sensing means and developing a first temperature output signal, a second temperature control means with adjustable setpoint connecting with said second sensing means and developing a said first output signal to the setpoint of said second temperature control means, means transmitting said second output signal to the setpoint of said flow controller, said means transmitting said octane output signal to the first temperature control means setpoint whereby the latter is adjusted responsive to bottoms octane number.

19. The system of claim 12 wherein said octane modifying stream comprises tetraethyl lead.

20. The system of claim 12 wherein said octane modifying stream comprises butane.

21. The system of claim 12 wherein said octane modifying stream comprises an aromatic selected from the group consisting of benzene, toluene and xylene.

22. The system of claim 12 wherein said octane modifying stream comprises a gasoline having an octane number higher than the octane number of said bottoms stream.

23. In combination with a continuous flow fractional distillation column, the feed to which is a gasoline fraction, the overhead from which comprises the lower boiling components of said fraction and the bottoms from which comprises the higher boiling components of said fraction, said column including a reboiler section having a vapor outlet connecting with the lower portion of the column and means to supply heat to said reboiler from an extraneous heat source, a control system for said column comprising:

(1) means operatively associated with said heat supply means to vary the heat input to said reboiler;

(2) a hydrocarbon analyzer comprising a stabilized cool flame front receiving a sample of said column bottoms and developing a bottoms octane number signal which provides a measure of sample octane number of said bottoms stream;

(3) means transmitting said bottoms octane signal to said heat input varying means whereby the heat input to said column is regulated responsive to said octane signal of said column bottoms and said octane number is thereby maintained at a substantially constant predetermined level;

(4) flow measurement means operatively associated with the bottoms stream to measure the flow rate of the bottoms stream and produce a bottoms flow rate output signal;

(5) means transmitting said bottoms flow rate output signal and said bottoms octane output signal to a volume-octane measurement means which means produces a volumetric octane output signal varying in proportion to the flow measurement means output signal and the octane analyzer octane output signal; and (6) means transmitting said volumetric-octane output signal to an octane blending means which comprises a flow control loop including a flow controller which controls the blending of an octane modifying stream with said bottoms stream and has an adjustable setpoint regulating the rate of flow of said bottoms stream to be blended with a modifying stream, said setpoint being adjusted in response to said volumetric-octane signal.

24. The system of claim 23 wherein the feed to said column comprises unstabilized gasoline, the overhead comprises $C_4$ and lighter hydrocarbons, and the bottoms comprises stabilized gasoline containing $C_5$ and heavier hydrocarbons.

25. The system of claim 23 wherein said heat input varying means comprises a flow control loop including a flow controller having an adjustable setpoint regulating the flow of heating medium through said reboiler, said setpoint being adjusted in response to said bottoms octane output signal.

26. The system of claim 25 further characterized in the provision of means to sense the temperature in said column at a locus below the feed inlet thereto, temperature control means having an adjustable setpoint connecting with said temperature sensing means and developing a temperature output signal, and means transmitting the last-mentioned output signal to the setpoint of said flow controller, said means transmitting said octane output signal to the temperature control means setpoint whereby the latter is adjusted responsive to bottoms octane number.

27. The system of claim 26 wherein said temperature sensing means is located in the vapor outlet from said reboiler.

28. The system of claim 26 wherein said temperature sensing means is located several trays above said vapor outlet.

29. The system of claim 25 further characterized in the provision of a first means to sense the temperature in said column at a locus below the feed inlet thereto and several trays above said reboiler vapor outlet, a second means to sense the temperature in said reboiler vapor outlet, a first temperature control means with adjustable setpoint connecting with said first sensing means and developing a first temperature output signal, a second temperature control means with adjustable setpoint connecting with said second sensing means and developing a second temperature output signal, means transmitting said first output signal to the setpoint of said second temperature control means, means transmitting said second output signal to the setpoint of said flow controller, said means transmitting said octane output signal to the first temperature control means setpoint whereby the latter is adjusted responsive to bottoms octane number.

30. The system of claim 23 wherein said octane modifying stream comprises tetraethyl lead.

31. The system of claim 23 wherein said octane modifying stream comprises butane.

32. The system of claim 23 wherein said octane modifying stream comprises an aromatic selected from the group consisting of benzene, toluene and xylene.

33. The system of claim 23 wherein said octane modifying stream comprises a gasoline having an octane number higher than the octane number of said bottoms stream.

References Cited
UNITED STATES PATENTS

| | | | |
|---|---|---|---|
| 3,646,634 | 3/1972 | Bajek et al. | 196—132 |
| 3,332,856 | 7/1967 | Hart | 203—2 |
| 3,582,281 | 6/1971 | Fenske et al. | 208—Dig. 1 |
| 3,420,748 | 1/1969 | Johnson et al. | 203—1 |

NORMAN YUDKOFF, Primary Examiner

D. EDWARDS, Assistant Examiner

U.S. Cl. X.R.

202—160; 203—2, 3, Dig. 18; 208—Dig. 1